Figure 1:
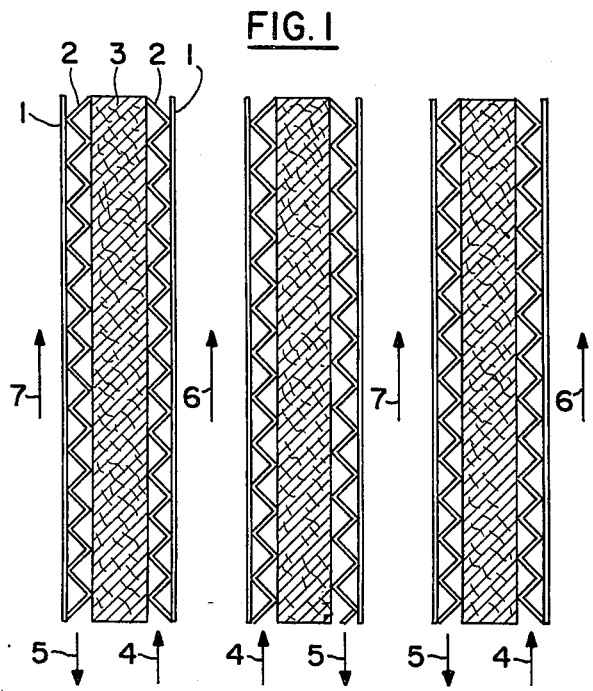

United States Patent [19]
Winsel et al.

[11] 3,976,510
[45] Aug. 24, 1976

[54] BATTERY RECOMBINATION REACTOR SYSTEM
[75] Inventors: August Winsel, Kelkheim, Taunus; Helmut Laig-Hörstebrock, Frankfurt am Main, both of Germany
[73] Assignee: Varta Batterie Aktiengesellschaft, Hannover, Germany
[22] Filed: Oct. 31, 1974
[21] Appl. No.: 519,517

[30] Foreign Application Priority Data
Nov. 19, 1973 Germany............................ 2357631

[52] U.S. Cl................................. 136/181; 136/86 R; 136/86 C
[51] Int. Cl.².......................................... H01M 8/06
[58] Field of Search................ 136/181, 86 R, 86 C

[56] References Cited
UNITED STATES PATENTS
| | | | |
|---|---|---|---|
| 3,370,984 | 2/1968 | Plalner | 136/86 R |
| 3,432,357 | 3/1969 | Dankese | 136/86 R |
| 3,484,294 | 12/1969 | Fischer et al. | 136/86 R |

*Primary Examiner*—John H. Mack
*Assistant Examiner*—H. A. Feeley
*Attorney, Agent, or Firm*—Weiser, Stapler & Spivak

[57] ABSTRACT

Separate cooling systems are provided for the heat of recombination and for the heat of condensation, respectively, of a hydrogen recombination reactor, such as used for lead storage batteries.

8 Claims, 6 Drawing Figures

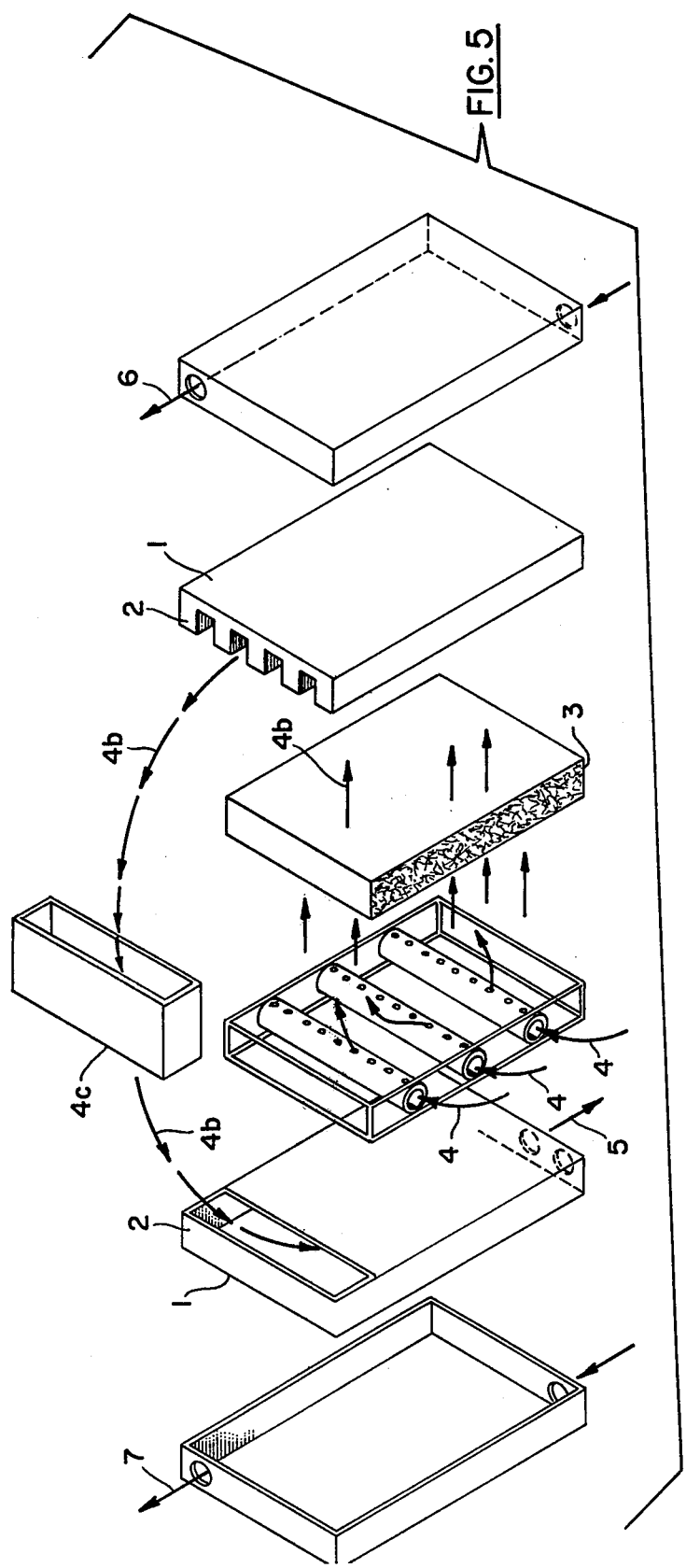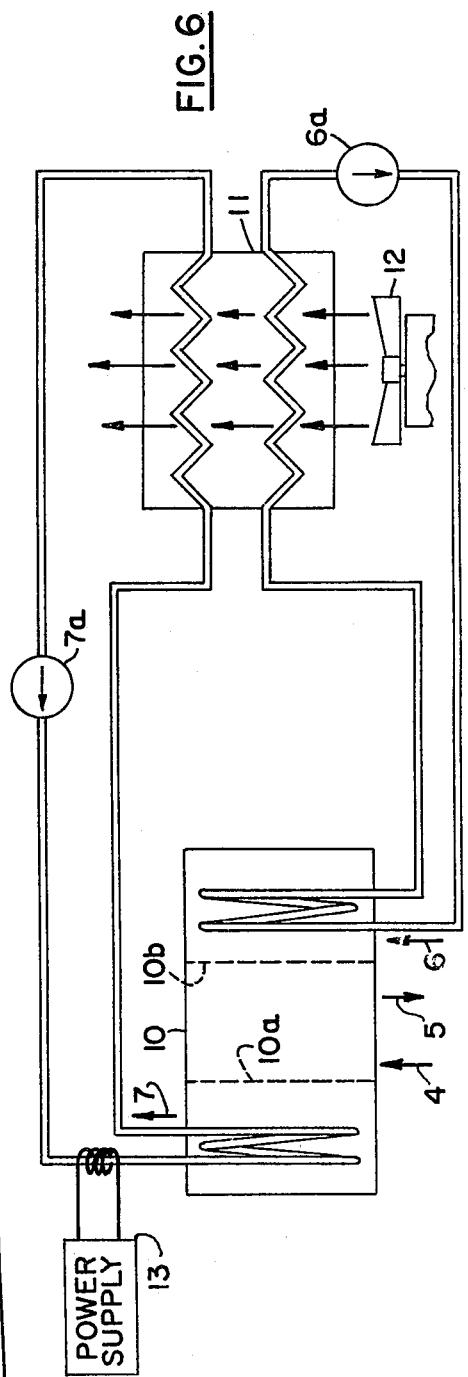

BATTERY RECOMBINATION REACTOR SYSTEM

The invention relates to a catalytic oxidation reactor for hydrogen or other combustible gases in an oxygen-containing mixture, and particularly to the oxidation of the hydrogen produced in galvanic secondary elements.

In lead storage batteries, hydrogen is evolved through internal discharge, under both open and closed circuit conditions. During charging, hydrogen and oxygen are evolved due to the high charging potential of the storage batteries, which exceeds the decomposition potential of the water. The electrolysis losses represent a significant reason why such storage batteries must be serviced at regular intervals.

Particularly in order to lengthen the intervals between servicings, multi-cell storage batteries are provided with centralized water refill systems. These permit centralized refilling of all the cells with distilled water, thereby compensating for the loss of water caused by electrolysis during charging and discharging.

To control the water regime of a lead acid storage battery, it has been proposed to recombine the gases which evolve during charging and/or discharging, or even when the battery is open-circuited, with the aid of so-called catalyst plugs. The reaction water condenses in these plugs and flows back into the electrolyte. Such an arrangement, however, is very expensive because each cell requires a catalyst plug. In addition, it is unreliable because the probability that a single plug may become inoperative is greatly magnified when several are involved, and even the loss of a single plug can lead to major malfunctions.

In addition, space limitations preclude the use of such an arrangement, particularly with vehicle batteries, because of the positioning of the catalyst plugs at the top of the battery.

Starting from these individual catalyst plugs, it is further known to provide, e.g. for a starter battery, a central water refill arrangement combined with a central recombination reactor (see German Gebrauchsmuster No. 7,133,811).

Such an arrangement also leads to considerable difficulties, especially when used in batteries for battery operated vehicles, because the large quantity of evolved gases places a lower limit on the size of the recombination reactor, and because the space within the vehicle itself is strictly limited. A further problem is the dissipation of the heat generated by the recombination. In a battery of, say, 50 ampere-hours at 144 volts, recombination of the gas quantities which evolve during full charging produces heat equivalent to approximately 3 kw.

Accordingly, it is an object of the invention to construct the recombination reactor in such a manner that it occupies the least possible space, and to simultaneously provide a cooling technique for the recombination reactor which also contributes to minimizing the space occupied by the reactor as well as by the cooling system.

This, and other objects of the invention which will appear, are achieved in accordance with the invention by providing the oxidation reactor with two coolant circulation systems. One of these serves to dissipate the reaction heat at temperatures above 100°C. The other serves to condense the reaction water at temperatures below 100°C.

The heat which is produced through recombination of hydrogen and oxygen at a comparatively low temperature (e.g. 200°C) consists of a reaction heat component and a latent component in the hot steam. The heat in the steam, which is primarily heat of condensation, constitutes approximately 14% of the entire amount of heat.

The reaction heat, which constitutes the overwhelming portion of the total amount of heat, is liberated right at the temperature of the catalyst, mainly in the range of about 150° to 250°C. On the other hand, the heat of condensation is liberated at temperatures below 100°C.

Accordingly, separation into two cooling systems in accordance with the invention makes it impossible to operate one of these circulation systems, namely the one for dissipating the heat of condensation, at a cooling water temperature of, say, 80°C. In the other circulation system, a considerably higher temperature coolant may be used. This yields the considerable advantage that the air cooler which may be used for that purpose can be laid out in space-saving fashion because, the greater the temperature difference between the cooling air and the medium to be cooled, the smaller the air cooler can be.

For further details, reference may be had to the description which follows, in the light of the accompanying drawings, wherein FIGS. 1 to 4 respectively illustrate, in diagrammatic form, various embodiments of the invention;

FIG. 5 is a somewhat more detailed, exploded view of one of the elements of an embodiment essentially equivalent to that of FIG. 1; and FIG. 6 is a diagrammatic illustration of an overall cooling system embodying the invention.

The same reference numerals are used in the various figures to denote similar elements.

Referring to FIG. 1, this shows the basic internal elements of an oxidation reactor. Each such element includes a multi-layered structure comprising cooling surfaces 1, spacers 2, and catalyst carrier 3. Preferably asbestos cloth layers are utilized as catalyst carriers. These may, if desired, be made hydrophobic and rendered catalytic by means of a noble metal catalyst of the platinum group, preferably platinum or palladium, if desired in combination with silver. Spacers 2 serve both for heat transfer from the catalyst layer to the cooling surfaces, and for the supply of the gas mixture to be recombined (as indicated by arrows 4) and for the removal of the resultant water (as indicated by arrows 5). As shown in FIG. 1, several of these basic elements are arranged side by side, or alternatively one above the other, in such manner that spaces remain between the individual elements. One set of these spaces is in communication with a first cooling circulation system 6 for the dissipation of recombination heat. The other set is in communication with the cooling circulation system 7 for the removal of heat of condensation. Aluminum is especially suitable for the cooling surface material. Aluminum may also be used for the spacer, e.g. in the form of an expanded metal web or grid. Obviously, it is also possible to provide the cooling surface sheets with ribs, so that they can serve as their own spacers. Also, one or both of the cooling surfaces 1 may be made of metal plates which have longitudinal slots milled therein to provide paths for the gas to flow as shown in FIG. 1. The ridges between slots then constitute the spacers 2. Typical dimensions are slots 2 mm wide and 5 mm deep, leaving 1 mm wide spacers and a solid plate 2 mm thick.

Figure 2:
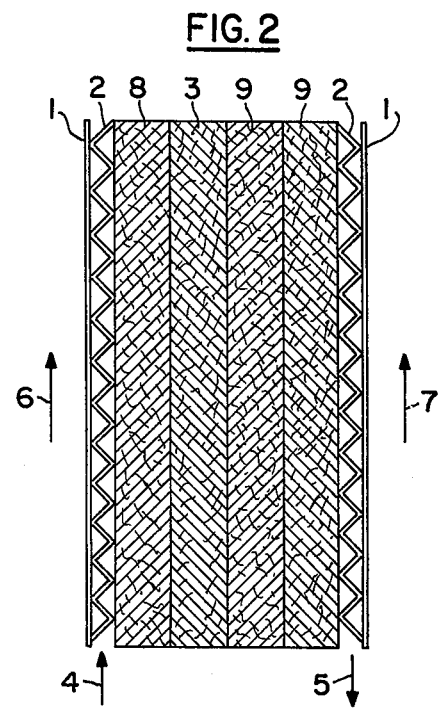

The catalyst layer may also be built up of several component layers. For example, as shown in FIG. 2, for the recombination of gases evolved in a lead storage battery, it may be desirable to apply to the catalyst layer 3, on the side through which the hydrogen-oxygen mixture 4 enters, an additional asbestos layer 8 provided with an antimony hydrogen catalyst, preferably with copper oxide. The other side may be covered with asbestos layers 9, which are not catalytically active but which control the heat conductivity while permitting gas to flow through.

Figure 3:
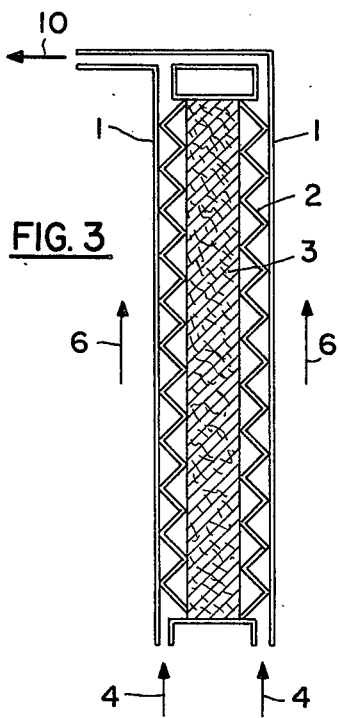

The reaction bodies, comprising asbestos and expanded metal layers on either side, are always provided on both sides with cooling surfaces. In the embodiment of FIG. 1 one such cooling surface 1 is coupled to the high temperature circulation system 6, while the other cooling surface 1 is coupled to the low temperature circulation system 7. However, as shown in FIG. 3, it is also possible to couple both cooling surfaces to the high temperature circulation system 6 and to remove the reaction product, namely water vapor, separately as indicated by arrow 10 in FIG. 3 and to subsequently condense it.

Figure 4:
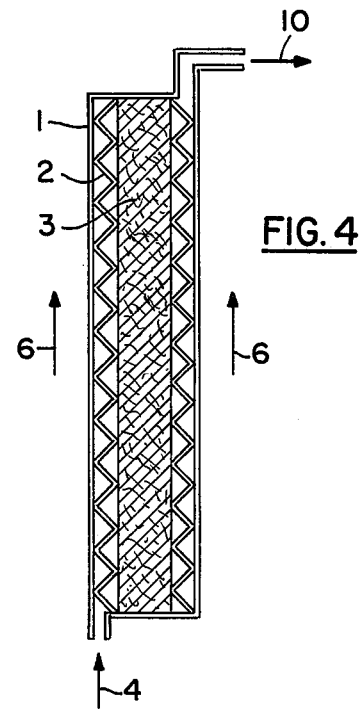

Another arrangement, in which the gases which are to be recombined pass through the catalyst body, is shown in FIG. 4. There, too, the cooling surfaces 1 are both in communication with the high temperature circulation system 6, while the water vapor is separately removed as indicated by arrow 10.

For connecting a reactor embodying the invention to a storage battery for battery powered vehicles, a piping system may be used to remove the gases evolved in the storage battery cells, which is preferably of plastic tubing, e.g. of PVC or polyethylene tubes. If desired, forced circulation of the gases may be produced in this piping system by means of a blower. This is desirable in those cases in which the formation of high concentration of hydrogen and oxygen is to be prevented. In addition, between individual cell groups or single cells respectively a so-called Davy barrier may be provided, to prevent passage of shock waves. For example, metal screens can be used for that purpose. Such screens have been used in miners' lamps to provide protection against ignition of combustible mine gases.

Since, particularly in lead storage batteries, the hydrogen and oxygen gases are not always evolved in stochiometric relationship, it may be necessary to supply additional oxygen from the air. In addition, recombination reactors embodying the invention may be provided with a start-up heater, so that the combustion reaction starts quickly even at low temperaures. For example, the temperature of the catalyst carrier may be sensed and, if it drops too low, a heater, e.g. a resistance heater, may be energized.

The water formed through recombination and condensation is supplied through a manifold to a central refill system for the storage battery, by means of which the electrolyte level in the individual cells may be maintained constant.

FIG. 5 to which reference may now be had, shows an embodiment of the invention essentially equivalent to that of FIG. 1. However, FIG. 5 shows only one of the several multilayered structures, and that one in exploded view. This multilayered structure includes the catalyst carrier 3, on opposite sides of which are placed cooling surfaces 1. The gas mixture to be recombined is supplied through perforated pipes 4a forming a layer adjacent to one side of the catalyst carrier. As shown in FIG. 4, by arrows 4b, the gas mixture escaping from pipes 4a passes through catalyst carrier 3, and, in the form of water vapor, then flows upward through the milled slots which define spacers 2 between them. A manifold 4c ducts the water vapor across the top of the catalyst carrier 3 to the condensation chamber formed by surface 1 on its opposite side. This latter surface may also have milled slots defining spacers 2, but this is not essential due to the lower temperature conditions. The condensed water is withdrawn at 5.

On the outer sides of cooling surfaces 1 are the cooling circulation systems 6 and 7, respectively.

FIG. 6, to which reference may now be made, shows how an element like that of FIGS. 1 and 4 is hooked into a complete system. The element, itself, is diagrammatically shown at 10, between broken lines 10a and 10b. The gas inlet and water outlet are shown by arrows 4 and 5, as in FIGS. 1 and 4. Likewise, the high and low temperature cooling circulation systems are shown at 6 and 7, respectively. The coolant in each system flows through a closed loop which carries it through an air-cooled heat exchanger 11. Air flow over that exchanger is provided by blower 12. The coolant may be any heat exchanging medium with high boiling-point, low viscosity and high heat conductivity, e.g. mixtures of benzylbenzene, diphenyl and mineral oils. Pumps 6a and 7a are provided to effect flow in circulation systems 6 and 7, respectively. FIG. 6 also shows an electrical power supply 13 connected to a resistance heating coil 14 which can be energized to heat the conduit of the cooling circulation system if that becomes necessary to provide start-up heating under low temperature conditions.

We claim:
1. A catalytic oxidation reactor, particularly for the recombination of hydrogen and oxygen evolved in secondary galvanic elements, comprising:
 a catalyst-bearing porous layer;
 means for introducing the evolved hydrogen and oxygen in distributed manner along one face of the layer;
 means providing a first space for the collection of recombination product along the opposite face of the layer;
 means for ducting the collected product into a second space adjacent the distributed introducing means; and
 means for cooling the collected product both in the first and second space.
2. The reactor of claim 1 wherein,
 the means for cooling the product in the first space comprises a first cooling system for dissipating the heat of reaction produced by said recombination in said reactor; and
 the means for cooling the product in the second space comprises a second cooling system separate from the first for dissipating the heat of condensation of the reaction product produced by said recombination.
3. The reactor of claim 2, wherein said first cooling system is a relatively high temperature system utilizing air cooling and said second cooling system is a relatively low temperature system utilizing water cooling.
4. The reactor of claim 1, wherein said porous layer comprises asbestos cloth made catalytically active by means of a noble metal catalyst of the platinum group, preferably platinum or palladium, if desired in combination with silver.

5. The reactor of claim 4, further comprising an additional asbestos layer on that side of the catalytically active layer which is supplied with the gas to be recombined, said additional asbestos layers containing an antimony hydrogen catalyst, preferably copper oxide.

6. The reactor of claim 4, further comprising at least one additional porous cover layer adjacent the catalytically active asbestos layer on the side of recombination product collection, said additional cover layer preferably being of asbestos.

7. The reactor of claim 1, further comprising electrical heating means responsive to the falling of the temperature of said reactor below a predetermined value to supply heat to said catalytically active layer.

8. The reactor of claim 2, wherein said first cooling system is a relatively high temperature system and said second cooling system is a relatively low cooling system both utilizing a fluid heat exchanging medium.

* * * * *